United States Patent Office 2,938,304
Patented May 31, 1960

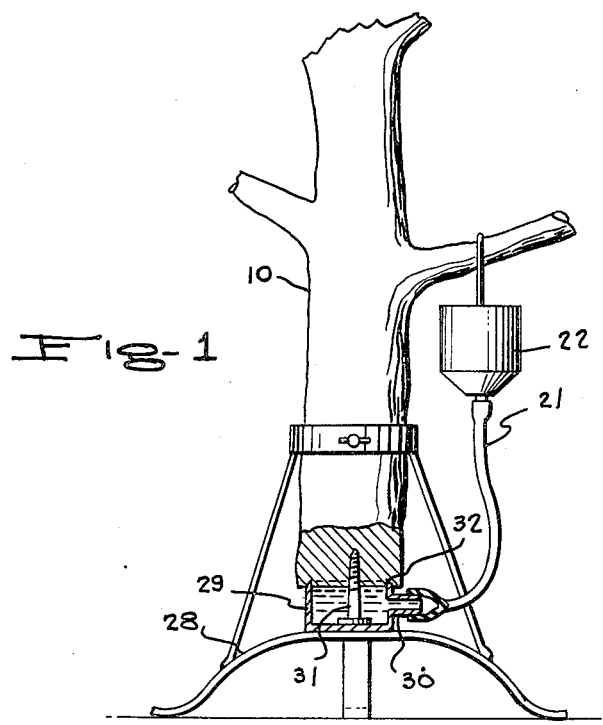
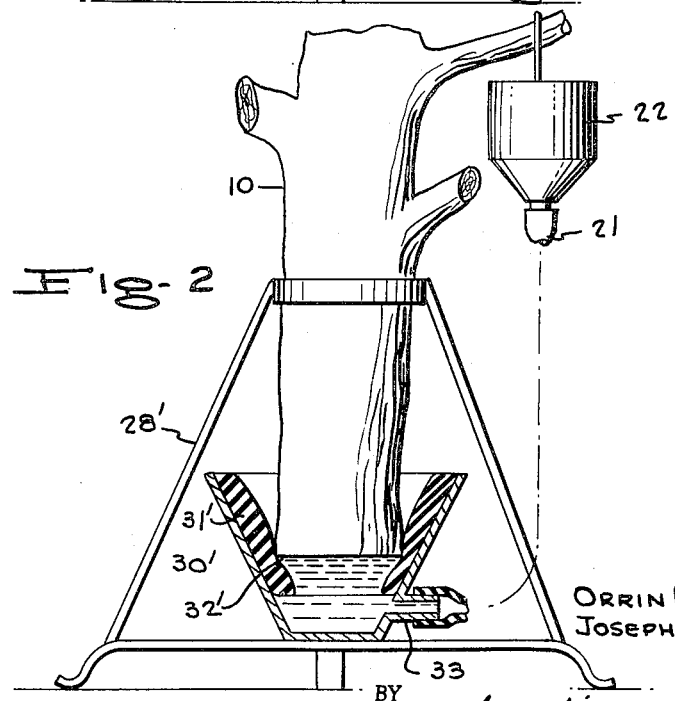
INVENTORS
ORRIN H. THOMAS
JOSEPH MARCONI

2,938,304
MEANS FOR WATERING CHRISTMAS TREES

Orrin H. Thomas, Endwell, and Joseph Marconi, Johnson City, N.Y., assignors to Endicott Machine & Tool Co. Inc., Endicott, N.Y.

Filed June 6, 1957, Ser. No. 663,962

2 Claims. (Cl. 47—57.5)

This invention relates to a watering device for Christmas trees and it consists in the constructions, arrangements and combinations herein described and claimed.

Heretofore attempts have been made to maintain Christmas trees fresh by providing a container for water and placing the base of the trunk in the water, or in another instance a chamber has been provided in the tree support or holder, and in all forms it is intended that the trunk of the tree will feed water to the branches through absorption. In these known forms, the water will evaporate and must be replenished, and after a tree has been decorated this is an awkward problem.

It is therefore the cardinal object of the invention to provide a watering device for trees, wherein a water container is mounted upon a branch of a tree, the container having a tube for discharge of water into a water-receiving receptacle supporting the tree, the water receiving receptacle having an air and water-tight seal at the base of the tree.

Additional objects, advantages and features of invention will be apparent from the following description considered in conjunction with the accompanying drawings, wherein Figure 1 is a side elevation of a Christmas tree having the watering device installed, the water receptacle and trunk of the tree being shown partly in section, and Figure 2 is a similar view of a further form of the device.

With reference to Figure 1 of the drawings, it will be seen that the tree 10 is suported in an upright position by means of a stand 28 which includes as an integral part thereof a water receiving receptacle 29 which is positioned medially of the stand, the receptacle being secured to the base of the tree by a screw 31. The upper edge 32 of the receptacle is sharpened so as to penetrate the trunk to effect a water-tight seal. The hose 21 from the water container 22 is connected to a nipple 30 of the receptacle 29 so that water may feed thereinto under action of gravity.

In Figure 2, a modified form of water feeding device is shown, but in this instance, the stand 28' has a funnel-shaped container 30' supporting the base of the tree. The container is provided with a thick rubber lining 31' upon which the base of the tree will seat, the weight of the tree will compress the lining at points of contact as at 32' to effect a seal against escape of water fed to the container through the tube 21 and nipple 33. By forming the container and lining of funnel-shape, the container will accommodate trunks of trees of varying diameters as well as compensate for any irregularities of the base of the trees.

From the foregoing description it will be seen that we have provided a watering device for Christmas trees wherein a constant supply of water is supplied to the exposed pulpous base portion of the trunk of a tree, thus prolonging the life of the tree.

While we have shown and described preferred forms of the device, this is by way of illustration only, and we consider as our own all such modifications in construction as fairly fall within the scope of the appended claims.

We claim:

1. In combination with a Christmas tree comprising a water container suspended within the tree at a distance above the base of the tree, support means for the base of the tree having a water-receiving receptacle, said receptacle having a compressible lining for sealing engagement around the base of the tree due to compression of said lining at contacting points with the base, and a water supply connection between said water container and said water-receiving receptacle.

2. In combination with a Christmas tree, a stand having a funnel-shaped water receptacle fixed medially of the stand, said receptacle having a thick rubber lining upon the interior thereof forming a seat for the base of a tree when positioned within the receptacle, the weight of the tree compressing the lining at contacting points forming a water-tight seal, said lining further accommodating various diameters of tree trunks and irregularities in the base of the tree trunks; a water container suspended within the tree at a distance above the base of the tree, said funnel-shaped water receptacle having a nipple adjacent the base of the recaptacle and a water conducting tube connected between the water container and said nipple.

References Cited in the file of this patent
UNITED STATES PATENTS

| | | |
|---|---|---|
| 124,419 | Cole | Mar. 12, 1872 |
| 177,770 | Thilmany | May 23, 1876 |
| 381,682 | Dudley | Apr. 24, 1888 |
| 952,245 | Gardner | Mar. 15, 1910 |
| 1,678,046 | Holmes | July 24, 1926 |
| 1,805,550 | Lipman et al. | May 19, 1931 |
| 1,856,000 | Smith | Apr. 26, 1932 |
| 2,462,486 | Gregory | Feb. 22, 1949 |

FOREIGN PATENTS

| | | |
|---|---|---|
| 188,456 | Germany | Sept. 10, 1907 |
| 678,660 | Germany | July 19, 1939 |
| 22,993 | Sweden | Aug. 24, 1907 |